(12) United States Patent
Loh

(10) Patent No.: US 10,150,023 B1
(45) Date of Patent: Dec. 11, 2018

(54) SPORT SKILL TRAINING APPARATUS

(71) Applicant: James Cheng Wah Loh, San Gabriel, CA (US)

(72) Inventor: James Cheng Wah Loh, San Gabriel, CA (US)

( * ) Notice: Subject to any disclaimer, the term of this patent is extended or adjusted under 35 U.S.C. 154(b) by 0 days.

(21) Appl. No.: 15/880,280

(22) Filed: Jan. 25, 2018

(51) Int. Cl.
| | |
|---|---|
| *A63B 69/00* | (2006.01) |
| *A63B 71/06* | (2006.01) |
| *G09B 19/00* | (2006.01) |
| *A63B 69/38* | (2006.01) |
| *A63B 102/02* | (2015.01) |

(52) U.S. Cl.
CPC .......... *A63B 69/0059* (2013.01); *A63B 69/38* (2013.01); *A63B 71/0622* (2013.01); *G09B 19/0038* (2013.01); *A63B 2071/0694* (2013.01); *A63B 2102/02* (2015.10); *A63B 2225/09* (2013.01)

(58) Field of Classification Search
CPC ................................. A63B 69/00; G09B 19/00
See application file for complete search history.

(56) References Cited

U.S. PATENT DOCUMENTS 6,755,755 B2    6/2004  Wah Loh

*Primary Examiner* — Gene Kim
*Assistant Examiner* — Christopher Glenn
(74) *Attorney, Agent, or Firm* — Tsz Lung Yeung

(57) ABSTRACT

A sport skill training apparatus includes an arm loop unit, a waist loop adjustment strap, and an elastic training arrangement. The waist loop adjustment strap includes a main strap element arranged to bend for forming a waist loop to accommodate a waist portion of the user, and a coupling unit connected to the main strap element to selectively and adjustably lock up a size of the waist loop. The elastic training arrangement is extended between the waist loop adjustment strap and the arm loop unit. The elastic training arrangement has a predetermined elasticity and at least one training indicator, wherein when the user's arm moves with respect to his waist portion, the elastic training arrangement is stretched and the training indicator is arranged to indicate the extent to which the elastic training arrangement is stretched so that a user may avoid further movement of the arm portion.

20 Claims, 6 Drawing Sheets

SPORT SKILL TRAINING APPARATUS

BACKGROUND OF THE PRESENT INVENTION

Field of Invention

The present invention relates to a sport training apparatus, and more particularly to a sports skill training apparatus comprising an elastic training arrangement which is capable of helping a user to build up muscle memory for a selected tennis swing form by monitoring and reproducing the training distance variation pattern of this selected swing form which is closely related to the movements of the muscles such as the waist, shoulders and deltoid muscles.

Description of Related Arts

U.S. Pat. No. 6,755,755 (hereinafter referred to as '755 patent) to Loh generally discloses a sports skill training arrangement which comprises a fibrous length-adjusting tension strap, an arm loop unit, a body connector, a waist adjuster, and a guiding arm strap. The basic idea of building muscle memories by using a sports skill elastic training arrangement such as the one described in '755 patent is to restrict the movements of the arm so as to reduce the power contribution from the muscles of the swinging arm for encouraging or even forcing the muscles on the torso such as those in the legs, waist and/or shoulders to coil up more. This has the effect of making up for the loss of power resulting from the restricted movement of the user's arms. Once the power contribution from the torso is increased and close to the maximum level of the user's capability then he would drive the ball with faster pace when the sports skill training arrangement is removed.

As shown in '755 patent, the swing form built with the arm's movement restricted is called a compact swing form whose driving power comes on mostly from the uncoiling of the big muscles on the torso instead of the uncoiling of the restricted smaller muscles on the swinging arm. As a result, the backward and forward swing are mostly carried out by the rotation of the big muscles on the torso (without much arm's movement) in a much shorter time to make the compact swing form a very effective tool to handle the fast incoming ball or the short ball dropping close to the net where the user has little time to reach and drive the ball back.

The above-mentioned sport skill training arrangement can only help to enhance the power output from the maximized contribution of the big muscles such as the legs, waist and shoulders on the torso and build muscle memory for a compact swing form to handle the timing problem better for the fast-incoming ball and short ball close to the net. But a decent swing form involves many other functional components such as the building muscle memories for accuracy, hand-eye coordination, trajectory control, consistency and even the power maximization by driving the ball like throwing a javelin. This can be carried out by wide range of arm swinging.

Another disadvantage of the above-mentioned sport skill elastic training arrangement is that when the control portion is shortened or when the user's arm is substantially restricted in its movement, the user's arm cannot move freely and function as a balancing tool to prevent the user from falling. This is especially true when the user moves quickly from one position to the other. As a result, the user may easily fall when he or she is wearing the sports skill elastic training arrangement in a game or training session. The situation worsens when the restricted arm is substantially prevented from stretching out for supporting the user's body when the body falls on the ground. In other words, the conventional sports skill elastic training arrangement may inflict substantial injury to the user.

So there exists a conflict between restricting the user's arm swinging movement and safety requirement. When the user's arm is substantially restricted, the user's body may not balance well. On the other hand, when the restriction on the user's arm is not enough or significant, the user may not build up his swinging form effectively.

As a result, there is a need to improve upon the conventional sports skill training arrangement and develop a new sport skill training apparatus with a different approach which may help to effectively and safely build any kind of muscle memories and swing movements for all the essential skills including the compact swing form without restricting the arm's swinging range.

SUMMARY OF THE PRESENT INVENTION

Certain variations of the present invention provide a sport skill training apparatus comprising an elastic training arrangement which is capable of helping a user to build up muscle memory of a decent swing form by indicating to the user not only the extent to which his arm moves with respect to his waist's portion through observing the movement pattern of the training indicators on the elastic training arrangement or the length variation pattern of the training distance, but also the sequential movements of the waist, shoulders and deltoid muscles by monitoring the orientation and shape variation pattern of the training distance in a real-time manner.

Certain variations of the present invention provide a sport skill training apparatus which is capable of building or improving a user's swinging form without exposing the user to a substantial chance of injury.

Certain variations of the present invention provide a sport skill training apparatus which is capable of promoting muscle memory for a swing form by repeating swinging movements exactly the same way whether or not the user is in a stationary condition or in a moving condition.

Certain variations of the present invention provide a sport skill training apparatus which is capable of promoting muscle memory for a swing form by making a major section of a waist loop portion wider so as to cover a larger area of the waist for increasing the frictional force created between the waist loop portion and the waist.

Certain variations of the present invention provide a sport skill training apparatus comprising an elastic training arrangement which comprises a plurality of training indicators for helping a user of the present invention to build muscle memory or swing form in a safe and effective manner in different approaches.

Certain variations of the present invention provide a sport skill training apparatus comprising an elastic training arrangement which is capable of helping a user to build up muscle memory for a selected tennis swing form by monitoring and reproducing the training distance variation pattern of this selected swing form which is closely related to the movements of the muscles between the two connecting positions of the training distance/guiding arm strap on the waist and the swinging arm such as the waist, shoulders and deltoid muscles or the waist, shoulders, deltoid and the elbow muscles.

In one aspect of the present invention, it provides a sport skill training apparatus, comprising:

an arm loop unit adapted for securely wrapping around an arm portion of a user;

a waist loop adjustment strap, which comprises:

a main strap element which is arranged to bend for forming a waist loop to accommodate a waist portion of the user, the main strap element having a connector end portion and a securing end portion, the connector end portion and the securing end portion being adjustably connected with each other through the coupling unit so as to allow the user's waist portion to fit into the waist loop;

a coupling unit which is connected to the main strap element, and comprises an adjustable waist connector connecting to the securing end portion in an adjustably movable manner, and a body connector connecting the connector end portion of the main strap element, the adjustable waist connector dividing the main strap element into a waist loop portion and a waist loop adjustment portion, the waist loop portion forming the waist loop of the main strap element, the waist loop adjustment portion integrally extending from the waist loop portion and out of the waist loop, the coupling unit being arranged to selectively and adjustably lock up a size of the waist loop so as to allow the waist loop adjustment strap to be securely and adjustably wrapped around the waist portion, and to normally retain a substantially fixed relative position between the coupling unit and the arm loop unit; and a waist loop size retainer slidably provided on the main strap element at a position in a vicinity of the adjustable waist connector of the coupling unit and outside of the waist loop for restricting a movement of the coupling unit along a longitudinal length of the main strap element; and an elastic training arrangement which is extended between the waist loop adjustment strap and the arm loop unit, the elastic training arrangement having a predetermined elasticity and at least one training indicator formed thereon, wherein when the user's arm moves with respect to the waist portion, the elastic training arrangement is stretched and the training indicator is arranged to indicate the extent to which the elastic training arrangement is stretched so as to allow a user to avoid further movement of the arm's portion.

The extension of the training distance varies during the swinging movement to form a length variation pattern of the training distance which can be used to describe the movement pattern of the arm loop unit on the swinging arm with respect to movement pattern of the coupling unit on the waist portion of the user or the arm's swinging range pattern with respect to the waist portion of the user.

During practice, the movement pattern of the swinging arm may stretch the training distance and produce a tension variation pattern on the both the arm loop unit on the swinging arm and the coupling unit on the waist portion of the user. Since the stress produced on the training distance is caused by the lengthening of the training arrangement and the training distance, hence the tension variation pattern of the training distance is closely related to the length variation pattern of the training distance and provides the same information on the power, accuracy and consistency of the swing form through a more convenient tool of feedback which is the stress variation pattern felt by the swinging arm.

The length, tension, orientation and shape variation patterns of the training distance are different aspects of the training distance variation pattern during the swinging movement and provide information on different functional components of the swing form through different kinds of feedbacks. The training distance variation pattern can not only be used to describe the movements of the muscles of the waist, shoulder and deltoid muscles but also used to help build muscle memories for improving the functional components of enhancing the power, hand-eye coordination, timing, rhythm, accuracy and consistency of the swing form.

This summary presented above is provided merely to introduce certain concepts and not to identify any key or essential features of the claimed subject matter.

DETAILED DESCRIPTION OF THE PREFERRED EMBODIMENT

Figure 1:
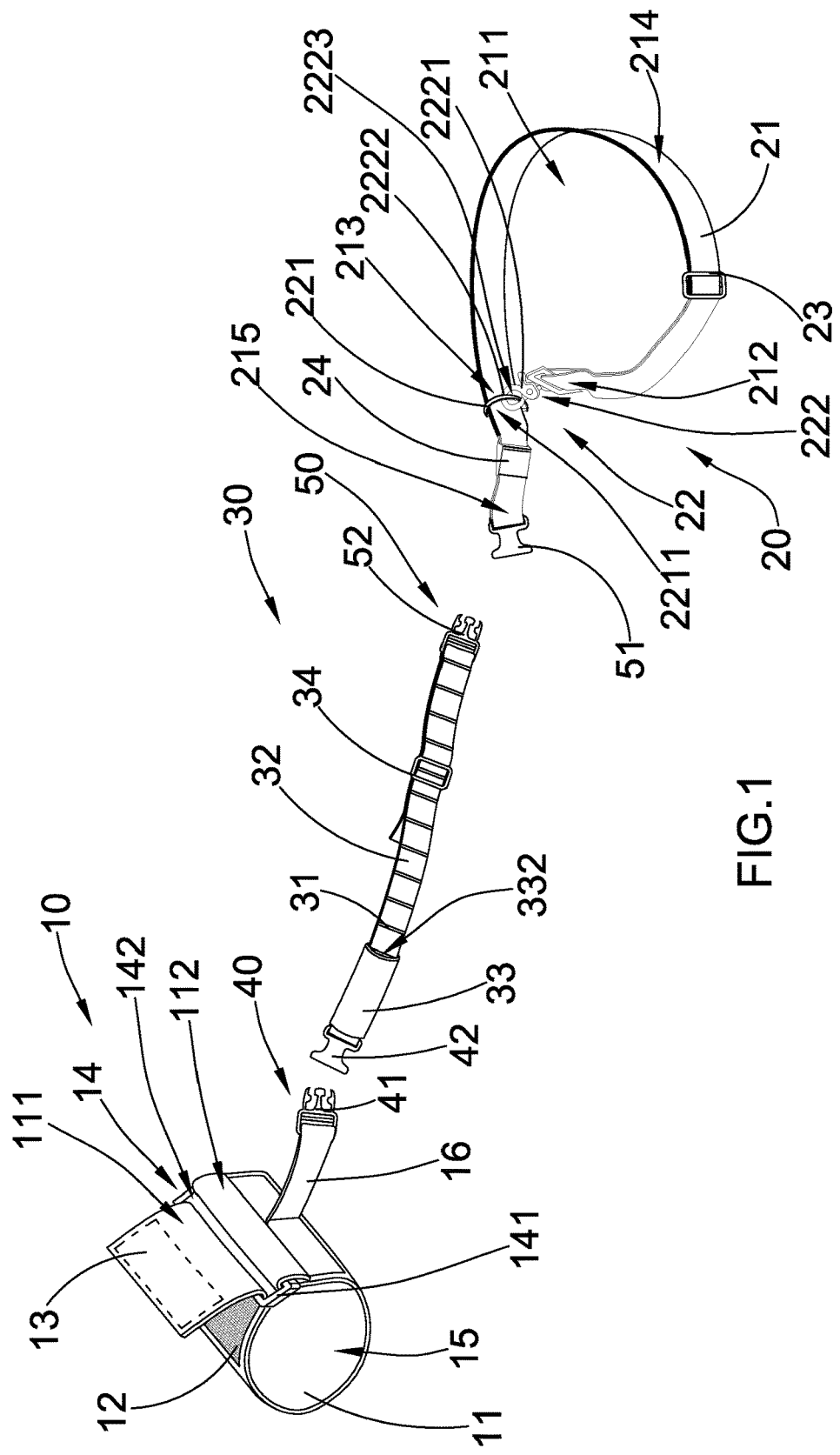
FIG. 1 is a perspective view of a sport skill training apparatus according to a preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIGS. 1 to 4 of the drawings, a sport skill training apparatus according a preferred embodiment of the present invention is illustrated. Broadly, the sport skill training apparatus may comprise an arm loop unit 10, a waist loop adjustment strap 20, and an elastic training arrangement 30. The arm loop unit 10 may be adapted for securely wrapping around an arm portion 81 of a user of the present invention.

The waist loop adjustment strap 20 may comprise a main strap element 21, a coupling unit 22, and a waist loop size retainer 24. The main strap element 21 may be arranged to bend for forming a waist loop 211 to accommodate a waist portion of the user. The coupling unit 22 may be connected to the main strap element 21 to selectively and adjustably lock up a size of the waist loop 211 with the help of the waist loop size retainer 24 fixed on the main strap element 21, outside of the waist loop 211 and adjacent to the coupling unit 22 to provide an upper limit for the circumference of the waist loop 211, so as to allow the waist loop adjustment strap 21 to be securely and adjustably wrapped around the waist portion 82 of the user, and to normally retain a fixed training distance d between the coupling unit 22 and the arm loop unit 10. Specifically, with the fixed training distance d, the relative position of the coupling unit 22 and the arm loop unit 10 is also substantially fixed.

The elastic training arrangement 30 may extend between the waist loop adjustment strap 20 and the arm loop unit 10.

The elastic training arrangement 30 may have a predetermined elasticity and at least one training indicator 31 formed thereon, wherein when the user's arm portion 81 moves with respect to the waist portion, the elastic training arrangement 30 is stretched and the training indicator 31 is arranged to indicate the extent to which the elastic training arrangement 30 is stretched so as to allow a user to observe the extent of stretching and to avoid further movement of the arm's portion.

According to the preferred embodiment of the present invention, the arm loop unit 10 may comprise an arm loop strap 11, a first arm loop fastener 12 attached on the arm loop strap 11, and a second arm loop fastener 13 also attached on the arm loop strap 11 but at a distance from the first arm loop fastener 12. The arm loop strap 11 may be made of fibrous or soft and flexible material and may be configured as having a flat contour or a flat structure so that the arm loop strap 11 may be bent to form an arm loop 15 for securely wrapping around the user's arm portion. As shown in FIG. 1 of the drawings, the first arm loop fastener 12 and the second arm loop fastener 13 may be configured as a hook fastener and a loop fastener respectively, or vice versa. The first arm loop fastener 12 may be detachably attached on the second arm loop fastener 13. The first arm loop fastener 12 and the second arm loop fastener 13 may be formed on the same side on the arm loop strap 11.

In order to make the arm loop unit 10 fit arm portions of varying sizes, the arm loop unit 10 may further comprise an arm loop connector 14 having a connector boundary 141 and at least one through arm loop slot 142 formed within the connector boundary 141. The arm loop strap 11 may have a first end portion 111 affixed to the arm loop connector 14 and a second end portion 112 passing through and wrapping around the arm loop slot 142 in such a manner that the first arm loop fastener 12 may be detachably attached on the second arm loop fastener 13. A user's arm portion 81 may pass through the arm loop 15. The arm loop strap 11 may have a predetermined width so that when the user's arm swings, the arm loop unit 10 may be capable of effectively limiting the swinging movement of the arm and promoting or encouraging the use of other body muscles (described below).

The main strap element 21 of the waist loop adjustment strap 20 may be elongated in shape and may be made of fibrous or soft and flexible material and may be configured as having a flat contour or a flat structure so that the main strap element 21 may be bent to form a waist loop 211 for securely wrapping around the user's waist portion. The main strap element 21 may have a connector end portion 212 and a securing end portion 213. The connector end portion 212 and the securing end portion 213 may be adjustably connected with each other through the coupling unit 22 so as to adjustably allow the user's waist portion to fit into the waist loop 211.

The coupling unit 22 may comprise an adjustable waist connector 221 connecting to the securing end portion 213 in an adjustably movable manner, and a body connector 222 connecting the connector end portion 212 of the main strap element 21. The adjustable waist connector 221 may be configured as an annular structure and may have a through hole 2211. The main strap element 21 may pass through the through hole 2211 of the adjustable waist connector 221 so that it may connect to the main strap element 21 at the securing end portion 213. Exemplary configurations of the adjustable waist connector 221 may be an O ring or a D ring.

On the other hand, the body connector 222 may have a through locking slot 2223, and may comprise a main connecting member 2221 and a clipping member 2222 movably connected to the main connecting member 2221. The locking slot 2223 may be formed within the main connecting member 2221 and the clipping member 2222. The clipping member 2222 be configured as a hook adapted for detachably fastening to the adjustable waist connector 221. The clipping member 2222 may be normally biased by a resilient element received in the main connecting member 2221 so as to drive the clipping member 2222 to normally bias against the main connecting member 2221. The clipping member 2222 may be selectively and temporarily pulled apart from the main connecting member 2221 for allowing a user to selectively connect the body connector 222 to the adjustable waist connector 221 which may penetrate through the locking slot 2223. The body connector 222 may also be configured in the form of a snap hook, a D ring or a strap loop connecting the connector end portion 212 of the main strap element 21 to the adjustable waist connector 221 of the coupling unit 22.

The waist loop adjustment strap 20 may further comprise a first length adjustment buckle 23 provided on the main strap element 21 at a position between the body connector 222 and the adjustable waist connector 221, wherein the main strap element 21 may be arranged to pass through the first length adjustment buckle 23 for adjusting a length thereof, and for optimally adjusting a diameter of the waist loop 211. With suitable size of the waist loop 211, the main strap element 21 may be fastened tightly around the waist portion 82 of the user so that the main strap element 21 and the adjustable waist connector 221 may be prevented from moving around the user's waist portion 82 in a typical training or game session, such as in a rally and competition. The first length adjustment buckle 23 may be configured in the form of a sliplock tri-glide buckle or a plastic slider.

The waist loop adjustment strap 20 may further comprise a waist loop size retainer 24 provided on the main strap element 21 at a position in the vicinity of the adjustable waist connector 221 of the coupling unit 22 for restricting a movement of the coupling unit 22 along a longitudinal length thereof. Specifically, the waist loop size retainer 24 may be provided on the main strap element 21 at a position outside of the waist loop 211 so that when the adjustable waist connector 221 is connected to the body connector 222, the position of the coupling unit 22 with respect to the main strap element 21 may be substantially retained by the waist loop size retainer 24 so as to substantially retain a size or a diameter of the waist loop 211 which may be small enough to generate a frictional force between the waist loop portion 214 and the waist portion 82 and at the same time large enough to prevent the coupling unit 22 and the main strap element 21 from moving or rotating around the user's waist portion 82. In the meantime, the training distance d formed between the coupling unit 22 and the arm loop unit 10 should be kept in a non-stretched state and straight form before the swinging movement. Only under this condition, the movement pattern of the training indicators 31 may be used to indicate the length variation pattern of the training distance d and may be used to describe the movement pattern of the arm loop unit 10 on the upper arm 81 with respect to the movement pattern of the coupling unit 22 on the waist portion 82 during the arm swinging movement. It is worth mentioning that when the size of the diameter of the waist loop 211 is substantially fixed, the training distance d may extend between the coupling unit 22 and the arm portion 81 where the arm loop unit 10 is located, and may have a length equal to the total length of the waist loop adjustment portion 215, the elastic training arrangement 30 and the arm loop extension strap 16. The training distance d may be substantially fixed so that a movement of the arm's portion 81 of the user may be substantially limited. A size of the waist loop 211 may also be substantially retained to prevent the main strap element 21 from moving or rotating around the user's waist portion 82.

The waist loop size retainer 24 may be connected to the main strap element 21 in a slidably movable manner. Once the user's waist portion 82 is accommodated in the waist loop 211, the waist loop size retainer 24 may be slidably moved to a suitable position on the main strap element 21 and then locked at that position for preventing the waist loop 211 from being substantially enlarged or deformed. Since the main strap element 21 is worn tightly on the user's waist portion 82, the waist loop 211 is not likely to shrink and reduce in size during the swinging movement. The result is that the size of the waist loop 211 may be substantially retained and kept constant even when the user is moving around during a typical training or competition session.

As a result, by slidably moving the waist loop size retainer 24 along the main strap element 21, the waist loop size retainer 24 may determine a range of the size or diameter of the waist loop 211. A user may freely adjust the size of the waist loop 211 by sliding the waist loop size retainer 24 along the main strap element 21. When the waist loop size retainer 24 is securely locked and the waist loop 211 tightly encircling the user's waist portion 82, the waist loop 211 of the main strap element 21 may be substantially retained in size and may not rotate or move around the user's waist portion 82 when he is playing a game or in a competition.

Accordingly, the main strap element 21 may be divided between a waist loop portion 214 and a waist loop adjustment portion 215, wherein the waist loop portion 214 may define the waist loop 211 formed by the main strap element 21, while the waist loop adjustment portion 215 may integrally extend from the waist loop portion 214 and out of the waist loop 211. Thus, the waist loop adjustment portion 215 may be located between the elastic training arrangement 30 and the adjustable waist connector 221 for the waist loop size retainer 24 to slide on and select a position to be locked to provide an upper limit of the diameter of the waist loop 211 securely fastening around the user's waist portion 82 and a lower limit for the waist loop adjustment portion 215 during rally and competition.

The position of the waist loop size retainer 24 should be properly chosen to make the size of the waist loop 211 small enough to produce a frictional force between the waist loop 211 and the waist portion 82 and at the same time large enough so that the adjustable waist connector 221 and the waist loop portion 214 will not move and rotate around the waist portion 82 no matter how large the pulling force is exerted on the coupling unit 22 and the arm loop unit 10 by the swinging arm.

The elastic training arrangement 30 may further comprise a tension strap 32 extended between the waist loop adjustment strap 20 and the arm loop unit 10, and a protective sleeve 33 detachably attached on the tension strap 32 for normally covering the training indicator 31. The tension strap 32 may have a certain elasticity so that when the user's arm portion 81 swings, it may exert an extension force to the tension strap 32 so that the training indicator 31 inside the protective sleeve may be stretched out of the protective sleeve 33 and may be visually observable by the user. When this occurs, it means that the user has swung his or her arm too much. Thus, when the user visually observes the training indicator 31, he will know that he has swung his arm too much and may try his best to avoid this for the rest of the training or game session. The major purpose of the sport skill training apparatus of the present invention is to help a user, such as a tennis player, to experiment different swinging styles by monitoring the variation of the length of the elastic training arrangement 30 in each individual swing during the practice and competition so that the user may figure out what kind of swinging style suits him most and produces the best result.

The elastic training arrangement 30 may comprise a plurality of training indicators 31 spacedly provided on the tension strap 32 and inside the protective sleeve 33 for indicating different extension positions thereof. Each of the training indicators 31 may be specifically colored to represent different meaning in associated with the corresponding extension of the tension strap 32. For example, a red training indicator 31 may signal that the tension strap 32 is stretched too much and should not occur again. On the other hand, a green training indicator 31 may signal that the tensions strap 32 is just slightly stretched and a user may avoid this by correcting his swinging form. The training indicators 31 may be imprinted on the tension strap 32 or attached thereon.

The elastic training arrangement 30 may further comprise a second length adjustment buckle 34 provided on the tension strap 32 for adjusting a selected length of the tension strap 32 of the elastic training arrangement 30. The second length adjustment buckle 34 may be configured in the form of a sliplock tri-glide buckle or a plastic slider mounted on the tensions strap 32. The tension strap 32 may penetrate through and wrap around the tension strap 32 for adjusting the length thereof.

Figure 5:
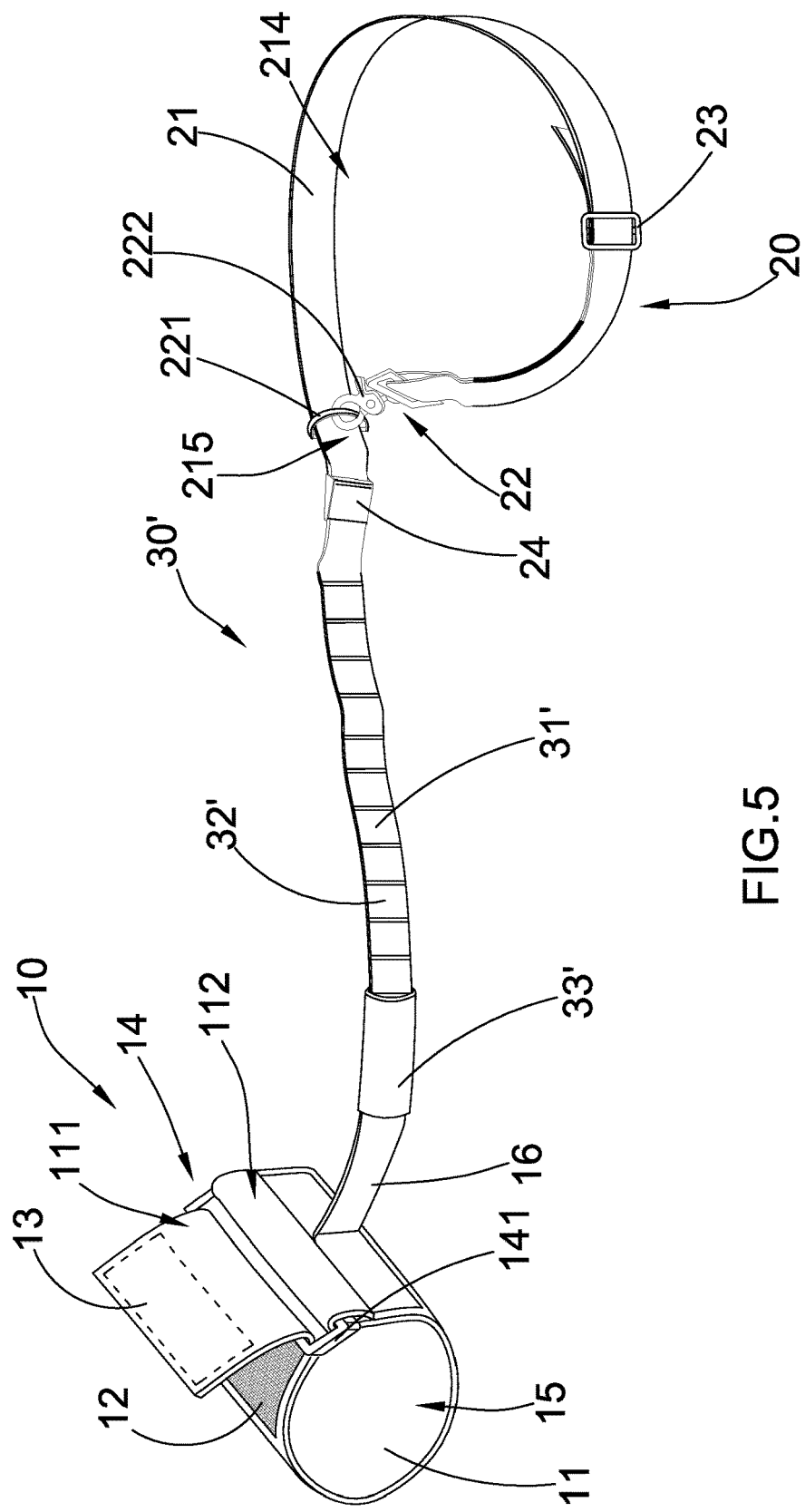
FIG. 5 is a first alternative mode of the sport skill training apparatus according to the preferred embodiment of the present invention.

The elastic training arrangement 30 may be integrally extended between the arm loop unit 10 and the waist loop adjustment strap 20 so that the entire sport skill training apparatus form an integral structure (as shown in FIG. 5 of the drawings). Alternatively, the elastic training arrangement 30 may be detachably attached on the arm loop unit 10 and the waist loop adjustment strap 20 so that a user may attach the elastic training arrangement 30 on the arm loop unit 10 and the waist loop adjustment strap 20 whenever appropriate.

Accordingly, the sport skill training apparatus may further comprise an upper strap connector unit 40 and a lower strap connector unit 50. The upper strap connector unit 40 may comprise a first strap fastener 41 and a second strap fastener 42 provided on the arm loop unit 10 and the tension strap 32 respectively. The first strap fastener 41 may be detachably connected to the second strap fastener 42 so as to detachably connect the elastic training arrangement 30 to the arm loop unit 10. Each of the first strap fastener 41 and the second strap fastener 42 may be configured as a side release buckle, key chain ring, strap loop or snap hook used to connect to another corresponding strap fastener 41 (42). As shown in FIG. 1 of the drawings, the arm loop unit 10 may further comprise an arm loop extension strap 16 having one end connected to the arm loop strap 11. The first strap fastener 41 may be provided on another end of the arm loop extension strap 16, and may be positioned to correspond to that of the second strap fastener 42.

Similarly, the lower strap connector unit 50 may comprise a third strap fastener 51 and a fourth strap fastener 52 provided on the waist loop adjustment strap 20 and the tension strap 32 respectively. The third strap fastener 51 may be detachably connected to the fourth strap fastener 52 so as to detachably connect the tension strap 32 of the elastic training arrangement 30 to the waist loop adjustment strap 20. Each of the third strap fastener 51 and the fourth strap fastener 52 may be configured as a side release buckle, key chain ring, strap loop or snap hook used to connect to another corresponding strap fastener 51 (52). As shown in FIG. 1 of the drawings, the third strap fastener 51 may be provided on a free end of the waist loop adjustment portion 215 of the main strap element 21. The fourth strap fastener 52 may be provided on another end of the tension strap 32, and may be positioned to correspond to that of the third strap fastener 51.

Thus, the second length adjustment buckle 34 may be provided on the tension strap 32 at a position between the upper strap connector unit 40 and the lower strap connector unit 50 to adjust the length of the tension strap 32 for assisting the user to build a proper style of swing form according to the properly chosen length of the generally fixed training distance d.

The protective sleeve 33 may be configured in as having a tubular structure which may have a receiving cavity 331 for accommodating at least a portion of the tension strap 32. The protective sleeve 33 may be securely provided on the tension strap 32, and may have a closed end supported or attached on the tension strap 32 at a position adjacent to or in the vicinity of the second strap fastener 42 of the upper strap connector unit 40. The protective sleeve 33 may further have an opening 332 formed at another end thereof, wherein the opening 332 may communicate the receiving cavity 331 with an exterior of the protective sleeve 33. The training indicators 31 may be distributed on the tension strap 32 along a longitudinal directional thereof in such a manner that some of the training indicators 31 may normally be covered by the protective sleeve 33, while the remaining training indicators 31 may normally expose to user's vision.

The operation of the present invention is as follows: a user may manually bend the main strap element 21 and wear it on his waist portion 82 so that his waist portion 82 is in the waist loop 211. After adjusting a suitable size of the waist loop 211, the user may connect the adjustable waist connector 221 to the body connector 222 in a manner described above. After that, the user may manually slide the waist loop size retainer 24 to a position adjacent to the adjustable waist connector 221, and lock up the position of the waist loop size retainer 24.

On the other hand, the user may securely wear the arm loop unit 10 on his arm portion 81 and optimally tighten the arm loop strap 11 thereon. When the elastic training arrangement 30 is connected between the arm loop unit 10 and the waist loop adjustment strap 20, the user's ability to swing his arm portion 81 may be severely limited by the tension exerted by the tension strap 32. When the user's ability to swing his arm portion 81 is severely limited, the user may be forced to use his other body muscles such as the waist and shoulder rotation to generate the power other than the arm swinging to drive the ball. He may also be forced to develop a very good footwork to help him get to the proper position (with respect to the incoming ball) and drive the ball with as much power and consistency as possible without the help of the arm's movement during a training session. Once the user can drive the ball consistently close to the target at the other side of the court with the restricted swinging arm, his swinging power and controlling skill may go up another notch when the sport skill training apparatus is removed and the arm's muscles join in to add more power and control on the driven ball.

By keeping the position of the adjustable waist connector 221 and the length of the training distance d unchanged, the swinging movement exercised by the user may be repeated in exactly the same manner thousands of times to form a certain swing form.

It is worth mentioning that the tension strap 32 and the training indicator 31 do not completely limit the swinging movement of the user's arm portion. Instead of completely limiting the movement of the arm or arm's swinging to build the muscle memory and swing form, the tension strap 32 and the training indicator 31 will help monitor the varying length of the training distance d which is closely associated with the swing form for each individual swing in, for example, an entire rally and competition session, to help the user to build up a new swing form by trying to swing at the ball without stretching the tension strap 32 and gradually build the new swing form characterized by the chosen length of the tension strap 32.

Thus, the elastic training arrangement 30 may be formed as the intermediary component between the waist loop adjustment strap 20 and the arm loop unit 10. During swinging movements, the movement pattern of the training indicators 31 not only provides a length variation pattern but also a perceivable tension variation pattern of the training distance d which roughly indicates the swinging range pattern of the arm portion 81 with respect to the waist portion 82. The necessary condition for using the movement pattern of the training indicator 31 to represent the swinging range pattern of the arm loop unit 10 on the upper arm portion 81 with respect to the coupling unit 22 on the waist portion 82 is that the position of the coupling unit 22 on the waist portion 82 is properly chosen, the length of the training distance d is properly selected and the training distance d is kept in a non-stretched state and a straight form before the swinging movement starts. Therefore, any movement of the arm loop unit 10 along the longitudinal length of training distance d will generate a movement pattern of the training indicators 31 to indicate the length variation pattern of the training distance d. More training indicators 31 stretching out of the protective sleeve 33 may indicate wider range of arm swinging movement which may produce more power to the swinging movement but will probably make the timing of contacting the ball at the proper position a little bit harder to control. To imitate and learn the swing form of a coach, the user should try to reproduce the training distance variation pattern (which may include the length, tension, orientation and shape variation pattern of the training distance d) of the coach's swing form.

Because of the elasticity of the tension strap 32 of the elastic training arrangement 30, the muscle memory for the new swing form cannot be formed by imposed restriction on the user's arm portion. Rather, the training indicators 31 may help building muscle memory according to a predetermined length of the training distance d. Thus, in order to build the muscle memory or swing form according a predetermined training distance d, a user has to learn to drive the ball without stretching the tension strap 32 during a typical training or competition session. Apart from keeping the eyes on the ball and the racket for better contact, the user of the present invention should also observe the training indicator 31 either inside or outside the protective sleeve 33 for each swing. In order for the elastic training arrangement 30 to work effectively, the adjustable waist connector 221 of the coupling unit 22 must remain substantially stationary with respect to the user's waist portion so that the movement or presence of the training indicators 31 may be caused by a corresponding extension of the tension strap 32.

This necessary condition can only be accomplished by attaching the waist loop size retainer 24 on the waist loop adjustment portion 215 of the main strap element 21 at a position between the lower strap connector unit 50 and the adjustable waist connector 221 as shown in FIG. 1 of the drawings. The user may attach and lock the waist loop size retainer 24 at a predetermined position so that the waist loop portion 214 is fastened around the user's waist portion 82 tightly enough to prevent the waist loop portion 214 and the adjustable waist connector 221 from moving around the waist portion during the rally and competition. Only under this condition the user of the present invention may drive the ball without changing the length of the training distance d and repeat the same swing form thousands of times to build the muscle memory for a specifically designed swing form.

In addition, by providing the elastic tension strap 32 of the elastic training arrangement 30, a user may have a certain freedom on the part of his arm portion 81 for carrying out the balancing function while he is playing in a typical game or training session, especially when the user is on the move and he is on the verge of losing his balance. When the user falls, he may stretch his arm portion 81 a little bit for supporting his body so as to prevent severe injury on other parts of his body.

The present invention may allow the user to repeat the same swing form under the stationary condition as well as in a moving condition (which is important for building the correct footwork and set up position to match the new swing form). For example, the elastic training arrangement 30 is capable of connecting the user's arm portion 81 to a selected spot on his waist portion 82 to create a visible movement of the training indicators 31 on the stretched or elongated tension strap 32 when the user is swinging a racket through her backswing.

The movement of the relevant training indicators 31 has a direct relationship between a length of the partially stretched tension strap 32 and the swing form only when the position of the adjustable waist connector 221 is substantially stationary with respect to the user's waist portion 82 during a game or a training session. This is achieved by placing the waist loop size retainer 24 on the waist loop adjustment portion 215 of the main strap element 21 at a position between the lower strap connector unit 50 and the adjustable waist connector 221 to set a proper upper limit for the circumference or a diameter of the waist loop portion 214. If the user can learn to swing the racket without lengthening the tension strap 32 by keeping a gap distance between any two adjacent training indicators 31 unchanged or keeping a relevant training indicator 31 to stay within the protective sleeve 33 repeatedly, the user is in effect learning a new swing form characterized by the chosen connecting position of the adjustable waist connector 221 and the selected length of the training distance.

Furthermore, in order to build a more compact swinging form which usually implies less extension of the swinging arm, a shorter tension strap 32 may be used. If the user can manage to swing a racket without lengthening the gap distance between any predetermined training indicators 31, or with the relevant training indicators 31 to be hidden inside the protective sleeve 33 during the rally and competition, he is beginning to master the new swing form pretty well.

The training indicators 31 may be configured to have various forms so as to fit different circumstances. For example, in order to make the movements of the training indicators 31 outside the protective sleeve 33 to be easier to observe, the training indicators 31 may be configured as color lines of the same color in the pattern of "closer pair" of two adjacent color lines with very small gap distance in between and "farther pair" of two adjacent color lines with significant larger gap distance in between painted alternately on the tension strap 32 so that the training indicators 31 may be easier to be observed when the elastic tension strap 32 is extended by the swinging movements. When the user starts the swinging movements with the tension strap 32 in a relaxed state with negligible tension, and if the gap distance between the closer pairs of the training indicators 31 is getting larger and becoming noticeable to the user during subsequent swinging movements, this indicates that the user is stretching the tension strap 32 too much and moving away from the compact swinging form which is expected to be built. Then the user may start shortening his arm swing (such as by tucking in his elbow and moving the racket head closer to the body without extending the arm) until he can hardly see the very short gap distance between the closer pairs of the training indicators 31.

When there are more than one training indicator 31 hidden inside the protective sleeve 33 and imprinted on the tension strap 32 with different colors. When the training distance d is kept straight, the elastic training arrangement 30 is in a non-stretched state with a properly selected length and the coupling unit 22 is fixed at a selected position where any movement of the arm loop unit 10 along the longitudinal length will slightly stretch the training distance d and at least one of these colored indicators 31 will be stretched out of the protective sleeve 33. Under this condition any swinging movement of the user's upper arm portion 81 will generate a variation pattern in the training distance d which may consist of a length, tension, orientation and shape variation pattern of the training distance d to describe the movements of the waist, shoulder and deltoid muscles. The length and tension variation pattern are closely related to the range of the arm swinging movement and can be used to build the muscle memory for the compact swing form with a selected shorter training distance d and driving the ball without stretching the training distance d before the racket contacts the ball. After the contact, the follow through movement of the racket head along the target line may stretch and lengthen the training distance d with some training indicators 31 coming out of the protective sleeve 33. The orientation and shape variation pattern of the training distance d are generally used to detect the sequential movements of the big muscles especially on whether the uncoiling of the waist and shoulders happen before or after the uncoiling of the deltoid muscle.

Another way to detect the extent of the lengthening of the tension strap 32 is to look for the movement of the training indicators 31 hidden under the protective sleeve 33 during the swinging movements. If the training indicators 31 inside the protective sleeve 33 are made of color lines with different colors and properly separated by selected gap distance of equal length, then the user may observe and estimate the extent of the lengthening of the tension strap 32 by counting the number of the different color lines appearing or coming out from the protective sleeve 33. If no color mark appears, then a new compact swinging form may begin to take shape as a new tool in the repertoire.

Figure 2:
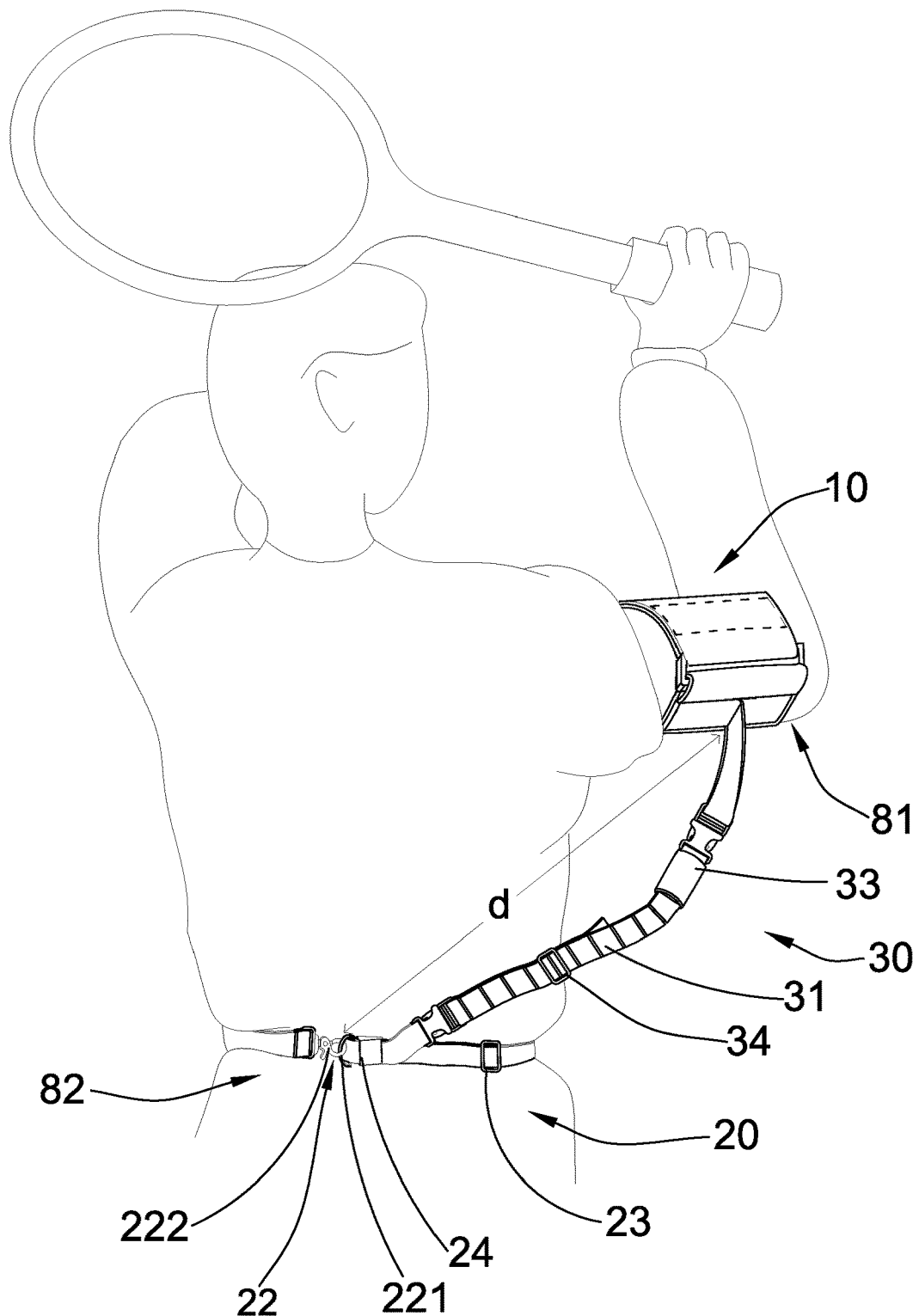
FIG. 2 is a schematic diagram of the sport skill training apparatus according to the preferred embodiment of the present invention, illustrating a user is wearing the sport skill training apparatus and holding a racket.
Figure 3:
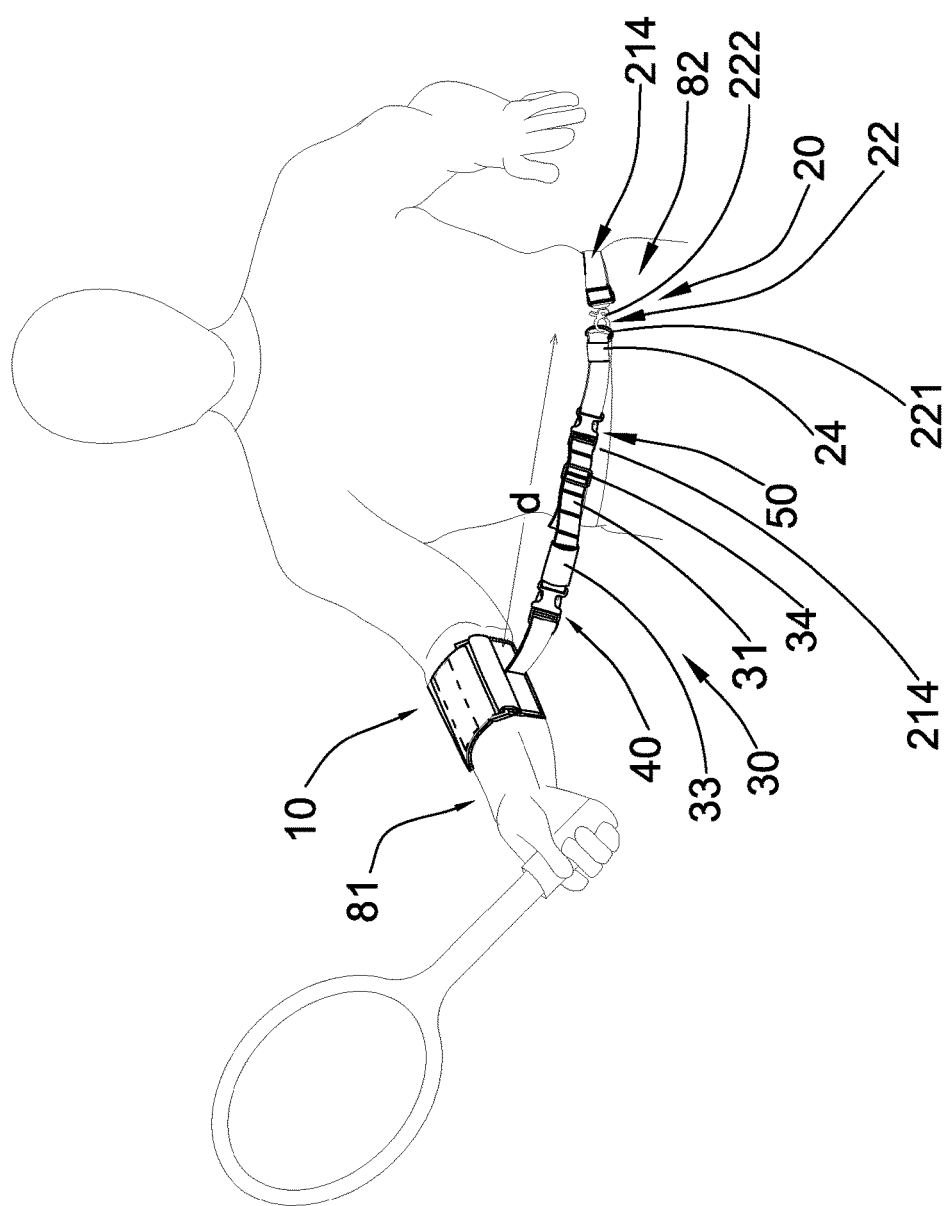
FIG. 3 is another schematic diagram of the sport skill training apparatus according to the preferred embodiment of the present invention, illustrating a user is wearing the sport skill training apparatus and holding a racket to move the arm loop unit from upper arm to forearm.
Figure 4:
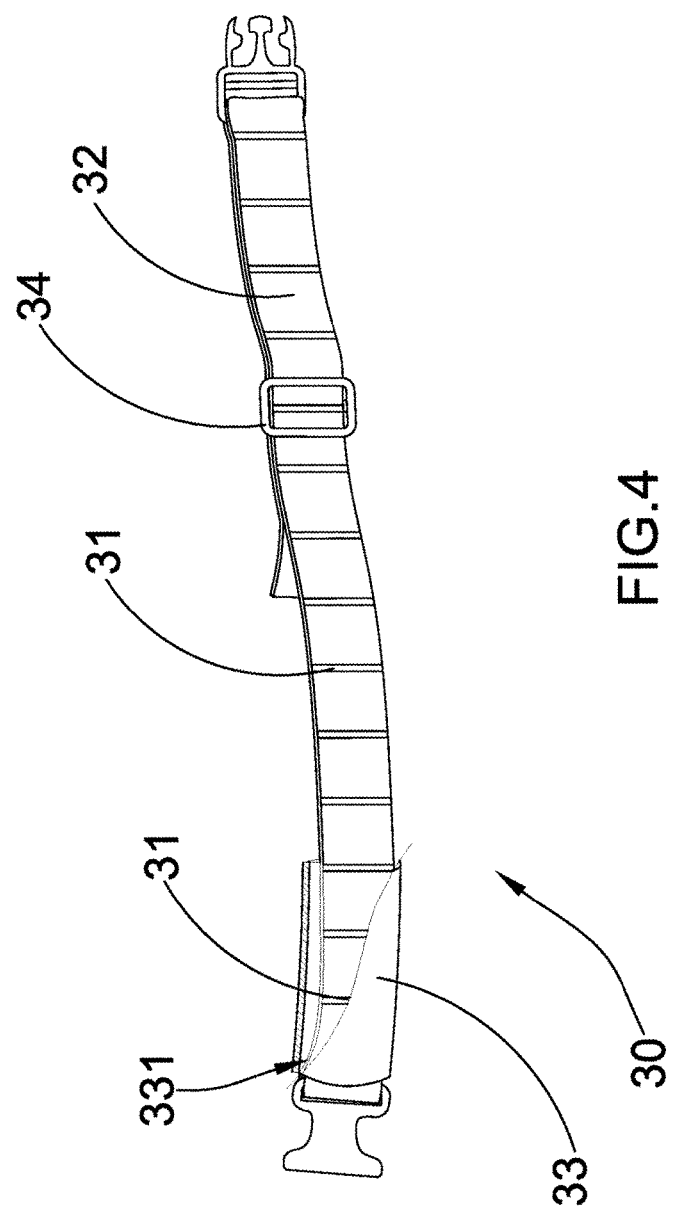
FIG. 4 is a schematic diagram of an elastic training arrangement of the sport skill training apparatus according to the preferred embodiment of the present invention.

Furthermore, the orientation variation pattern and the shape variation pattern of the training distance d are related to movement patterns of the muscles between the two connecting positions on both ends of the training distance d as shown in FIG. 2 and FIG. 3 of the drawings. The orientation variation pattern and the shape variation pattern of the training distance d are related to the sequential movements of the coiling and uncoiling of the waist, shoulder and deltoid muscles in FIG. 2 and will be used mainly to build muscle memory for sectional movement of making the waist and shoulder muscles uncoil before the uncoiling of the deltoid muscle to enhance the power, accuracy and consistency of the swing. In FIG. 3 of the drawings, the training distance d connects the waist to the lower arm and affects the movements of the waist, shoulders, deltoid and elbow. One of the applications for this kind of fastening is to build the muscle memory for slapping or spinning the ball with the uncoiling of the elbow and wrist. For example, when the length of the training distance d is chosen to be shorter and the elbow is made to rest on the chest throughout the swinging movement without any movement from the deltoid muscle, the user can build the muscle memory of the slapping movement by uncoiling the elbow and wrist in the direction of speeding up the racket movement along the target line to enhance the ball pace as fast as possible. The user may also build the muscle memory for top spin or side spin by rotating the wrist around the forearm and the forearm around the upper arm to brush the ball on the back from low to high to generate top spin, from right to left (for a right hander) to generate side spin or at a different angle for generating the combination of both top spin and side spin as much as possible when it is needed. Then the maximized elbow and wrist movements are added to the movements of the big muscles such as the legs, waist, shoulders and deltoid muscle mainly to manipulate the trajectory of the driven ball such as to help the ball clear the net, drop inside and close to the baseline or sideline and land at a properly chosen spot on the other side of the net and away from the opponent. When a ball is driven with the elbow tucked in on the chest to form a compact swing form, the timing and trajectory is easier to control to make it a more effective tool for driving a passing shot.

The other important function performed by the tension strap 32 is that the user's arm can move more freely to function as a balancing tool and reduce the chance for the user of the present invention to fall and get hurt badly.

The sport skill training apparatus of the present invention assists users to build a swing form by apportioning the amount of muscles used in a typical game session. For example, when the user's arm portion 81 may extend more fully, the user may use less of his other muscles when hitting a ball. Conversely, when the swinging movement of the user's arm portion 81 is limited, the user may be forced to use other muscles when swinging a racket to drive a ball.

The major purpose of the sport skill training apparatus of the present invention is to help a user, such as a tennis player, to experiment different swinging styles by monitoring the variation pattern in training distance d in each swing during the practice and competition so that the user may figure out what kind of swinging form produces the best result and repeat the variation pattern in the training distance d of that particular swinging movement thousands of times to build muscle memory for that particular swing form.

Apart from keeping the eyes on the ball and the racket for better contact, the user of the present invention should also observe the movements of the training indicators 31 either inside or outside the protective sleeve 33 for each swing and to make adjustment if needed. In order for the elastic training arrangement 30 to work more effectively, the adjustable waist connector 221 of the coupling unit 22 must remain substantially stationary with respect to the user's waist portion 82 so that the movement of the training indicators 31 may be caused by a corresponding slight extension of the training distance d.

Referring to FIG. 5 of the drawings, a first alternative mode of the sport skill training apparatus according to the preferred embodiment of the present invention is illustrated. The first alternative mode is similar to the preferred embodiment, except the elastic training arrangement 30' and the absence of the upper strap connector unit 40, the lower strap connector unit 50, and the second length adjustment buckle 34. In the first alternative mode, the tension strap 32' may integrally extend between the arm loop unit 10 and the waist loop adjustment strap 20. Thus, the tension strap 32' may have one end connected to the arm loop extension strap 16 of the arm loop unit 10, and another end connected to the waist loop adjustment portion 215 of the main strap element 21.

As in the preferred embodiment, the tension strap 32' may have a predetermined elasticity wherein the training indicators 31' may be formed thereon. The protective sleeve 33' may be attached on the tension strap 32' in the same manner as described in the preferred embodiment above.

Figure 6:
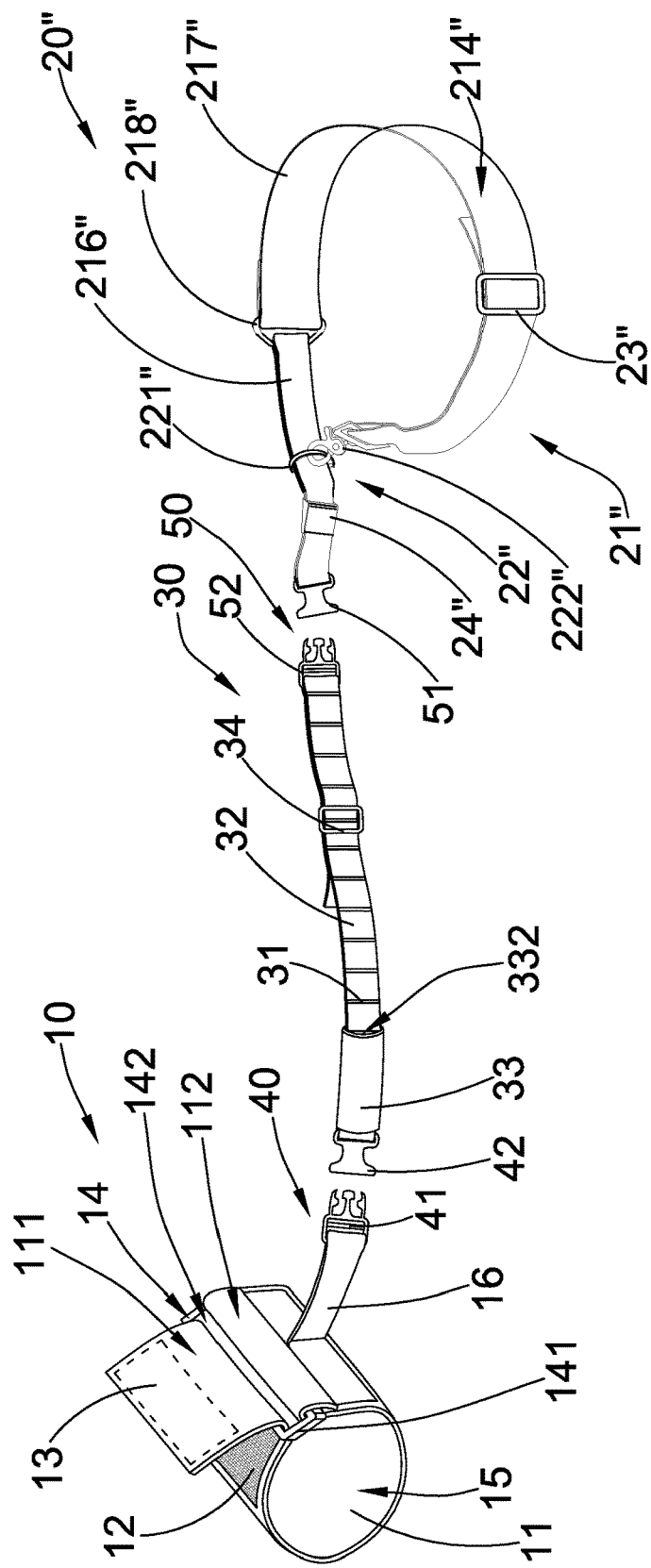
FIG. 6 is a second alternative mode of the sport skill training apparatus according to the preferred embodiment of the present invention.

Referring to FIG. 6 of the drawings, a second alternative mode of the sport skill training apparatus according to the preferred embodiment of the present invention is illustrated. The second alternative mode is similar to the preferred embodiment, except the waist loop adjustment strap 20".

According to the second alternative mode, the main strap element 21" may comprise a narrower strap element 216", a wider strap element 217", and a waist strap connector 218" connecting the narrower strap element 216" to the wider strap element 217". As the names imply, the narrower strap element 216" may have a width which is shorter than that of the wider strap element 217". The waist strap connector 218" may be configured in form of a D ring or triangular ring for connecting the narrower strap element 216" to the wider strap element 217".

The first length adjustment buckle 23" may be attached on the wider strap element 217" of the main strap element 21" so that a length of the wider strap element 217" may be adjusted. The wider strap element 217" may provide a relatively larger contact surface area between the waist loop portion 214" and the user's waist portion 82 to produce a greater frictional force for preventing the waist loop portion 214" from moving or rotating around the user's waist portion.

On the other hand, the narrower strap element 216" may be provided between the waist strap connector 218" and the adjustable waist connector 221" of the coupling unit 22" to provide a certain amount of space for the waist loop size retainer 24" to slide and to be locked. The strap formed between the narrower strap element 216" and the lower strap connector unit 50 may also may the same thickness as that of the narrower strap element 216" to provide a certain amount of space for the waist loop size retainer 24" to slide and to be locked. In such a scenario, the diameter of the waist loop portion 214" is small enough to produce a frictional force between the waist loop portion 214" and the user's waist portion, and at the same time large enough to prevent the waist loop portion 214" from moving or rotating around the user's waist portion 82. Similar to the preferred embodiment described above, the body connector 222" may be provided on the wider strap element 217" and may be arranged to connect to the adjustable waist connector 221".

It is worth mentioning that the features described in the above preferred embodiment and its alternative may be combined in different ways without departing from the spirit of the present invention. The present invention, while illustrated and described in terms of a preferred embodiment and several alternatives, is not limited to the particular description contained in this specification. Additional alternative or equivalent components could also be used to practice the present invention.

What is claimed is:

1. A sport skill training apparatus, comprising: an arm loop unit adapted for securely wrapping around an arm portion of a user; a waist loop adjustment strap, which comprises: a main strap element which is arranged to bend for forming a waist loop to accommodate a waist portion of said user, said main strap element having a connector end portion and a securing end portion, said connector end portion and said securing end portion being adjustably connected with each other through a coupling unit so as to allow said user's waist portion to fit into said waist loop; a coupling unit which is connected to said main strap element, and comprises an adjustable waist connector connecting to said securing end portion in an adjustably movable manner, and a body connector connecting said connector end portion of said main strap element, said adjustable waist connector dividing said main strap element into a waist loop portion and a waist loop adjustment portion, said waist loop portion forming said waist loop of said main strap element, said waist loop adjustment portion integrally extending from said waist loop portion and out of said waist loop, said coupling unit being arranged to selectively and adjustably lock up a size of said waist loop so as to allow said waist loop adjustment strap to be securely and adjustably wrapped around said waist portion, and to normally retain a substantially fixed relative position between said coupling unit and said arm loop unit; and a waist loop size retainer slidably provided on said main strap element at a position in a vicinity of said adjustable waist connector of said coupling unit and outside of said waist loop for restricting a movement of said coupling unit along a longitudinal length of said main strap element; and an elastic training arrangement which is extended between said waist loop adjustment strap and said arm loop unit, said elastic training arrangement having a predetermined elasticity and at least one training indicator formed thereon, wherein when said user's arm moves with respect to said waist portion, said elastic training arrangement is stretched and said training indicator is arranged to indicate the extent to which said elastic training arrangement is stretched so as to allow a user to avoid further movement of said arm portion.

2. The sport skill training apparatus, as recited in claim 1, wherein said elastic training arrangement further comprises a tension strap extended between said waist loop adjustment strap and said arm loop unit, and a protective sleeve detachably attached on said tension strap for normally covering said training indicator, said tension strap having a predetermined elasticity so that when said arm portion of said user swings, an extension force is exerted on said tension strap so that said training indicator is stretched out of said protective sleeve.

3. The sport skill training apparatus, as recited in claim 1, wherein said elastic training arrangement further comprises a plurality of training indicators spacedly provided on said tension strap, each of said training indicators having a predetermined color.

4. The sport skill training apparatus, as recited in claim 2, wherein said elastic training arrangement further comprises a plurality of training indicators spacedly provided on said tension strap, each of said training indicators having a predetermined color.

5. The sport skill training apparatus, as recited in claim 3, wherein said elastic training arrangement further comprises an upper strap connector unit which comprises a first strap fastener and a second strap fastener provided on said arm loop unit and said tension strap respectively, said first strap fastener being detachably connected to said second strap fastener so as to detachably connect said elastic training arrangement to said arm loop unit.

6. The sport skill training apparatus, as recited in claim 4, wherein said elastic training arrangement further comprises an upper strap connector unit which comprises a first strap fastener and a second strap fastener provided on said arm loop unit and said tension strap respectively, said first strap fastener being detachably connected to said second strap fastener so as to detachably connect said elastic training arrangement to said arm loop unit.

7. The sport skill training apparatus, as recited in claim 5, wherein said elastic training arrangement further comprises a lower strap connector unit which comprises a third strap fastener and a fourth strap fastener provided on said waist loop adjustment strap and said tension strap respectively, said third strap fastener being detachably connected to said fourth strap fastener so as to detachably connect said elastic training arrangement to said waist loop adjustment strap.

8. The sport skill training apparatus, as recited in claim 6, wherein said elastic training arrangement further comprises a lower strap connector coupling unit which comprises a third strap fastener and a fourth strap fastener provided on said waist loop adjustment strap and said tension strap respectively, said third strap fastener being detachably connected to said fourth strap fastener so as to detachably connect said elastic training arrangement to said waist loop adjustment strap.

9. The sport skill training apparatus, as recited in claim 6, wherein said protective sleeve has a tubular structure and has a receiving cavity for accommodating at least a portion of said tension strap, said protective sleeve being securely provided on said tension strap, and having a closed end supported on said tension strap at a position adjacent to said second strap fastener of said upper strap connector unit, said protective sleeve further having an opening formed at another end thereof, wherein said opening communicates said receiving cavity with an exterior of said protective sleeve, at least one of said training indicators being normally covered by said protective sleeve.

10. The sport skill training apparatus, as recited in claim 8, wherein said protective sleeve has a tubular structure and has a receiving cavity for accommodating at least a portion of said tension strap, said protective sleeve being securely provided on said tension strap, and having a closed end supported on said tension strap at a position adjacent to said second strap fastener of said upper strap connector coupling unit, said protective sleeve further having an opening formed at another end thereof, wherein said opening communicates said receiving cavity with an exterior of said protective sleeve, at least one of said training indicators being normally covered by said protective sleeve.

11. The sport skill training apparatus, as recited in claim 9, wherein at least one training indicator is configured as a pair of spacedly apart color lines.

12. The sport skill training apparatus, as recited in claim 10, wherein at least one training indicator is configured as a pair of spacedly apart color lines.

13. The sport skill training apparatus, as recited in claim 2, wherein said tension strap has one end connected to said arm loop unit, and another end connected to said waist loop adjustment portion of said main strap element, said tension strap being integrally extend between said arm loop unit and said waist loop adjustment strap.

14. The sport skill training apparatus, as recited in claim 13, wherein said protective sleeve has a tubular structure and has a receiving cavity for accommodating at least a portion of said tension strap, said protective sleeve being securely provided on said tension strap, and having a closed end supported on said tension strap at a position adjacent to said arm loop unit, said protective sleeve further having an opening formed at another end thereof, wherein said opening communicates said receiving cavity with an exterior of said protective sleeve, at least one of said training indicators being normally covered by said protective sleeve.

15. The sport skill training apparatus, as recited in claim 14, wherein at least one training indicator is configured as a pair of spacedly apart color lines.

16. The sport skill training apparatus, as recited in claim 1, wherein said main strap element comprises a narrower strap element, a wider strap element, and a waist strap connector connecting said narrower strap element and said wider strap element, said narrower strap element having a width which is shorter than a width of said wider strap element.

17. The sport skill training apparatus, as recited in claim 2, wherein said main strap element comprises a narrower strap element, a wider strap element, and a waist strap connector connecting said narrower strap element and said wider strap element, said narrower strap element having a width which is shorter than a width of said wider strap element.

18. The sport skill training apparatus, as recited in claim 12, wherein said main strap element comprises a narrower strap element, a wider strap element, and a waist strap connector connecting said narrower strap element and said wider strap element, said narrower strap element having a width which is shorter than a width of said wider strap element.

19. The sport skill training apparatus, as recited in claim 17, wherein said waist loop adjustment strap further comprises a first length adjustment buckle attached on said wider strap element of said main strap element so as to adjust a length of said wider strap element.

20. The sport skill training apparatus, as recited in claim 18, wherein said waist loop adjustment strap further comprises a first length adjustment buckle attached on said wider strap element of said main strap element so as to adjust a length of said wider strap element.

* * * * *